(12) United States Patent
Abe et al.

(10) Patent No.: US 9,430,215 B2
(45) Date of Patent: Aug. 30, 2016

(54) TERMINAL, TERMINAL SYSTEM, AND NON-TRANSITORY COMPUTER-READABLE MEDIUM FOR UPDATING A TERMINAL USING MULTIPLE MANAGEMENT DEVICES

(71) Applicants: Mikiko Abe, Tokyo (JP); Tsuyoshi Shigemasa, Tokyo (JP); Masahiro Ujiie, Tokyo (JP); Taro Okuyama, Tokyo (JP); Yoshinaga Kato, Kanagawa (JP)

(72) Inventors: Mikiko Abe, Tokyo (JP); Tsuyoshi Shigemasa, Tokyo (JP); Masahiro Ujiie, Tokyo (JP); Taro Okuyama, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 87 days.

(21) Appl. No.: 14/225,914

(22) Filed: Mar. 26, 2014

(65) Prior Publication Data
US 2014/0298311 A1 Oct. 2, 2014

(30) Foreign Application Priority Data

Mar. 26, 2013 (JP) .................................. 2013-065093
Mar. 14, 2014 (JP) .................................. 2014-052747

(51) Int. Cl.
*G06F 9/445* (2006.01)

(52) U.S. Cl.
CPC ....................................... *G06F 8/65* (2013.01)

(58) Field of Classification Search
None
See application file for complete search history.

(56) References Cited

U.S. PATENT DOCUMENTS

| | | | | |
|---|---|---|---|---|
| 6,687,901 B1 * | 2/2004 | Imamatsu | ................. | G06F 8/65 455/418 |
| 7,219,140 B2 * | 5/2007 | Marl | ................. | H04L 29/08846 709/219 |
| 8,701,104 B2 * | 4/2014 | Soderstedt | ................ | G06F 8/66 709/203 |
| 9,032,385 B2 * | 5/2015 | Kim | .......................... | G06F 8/65 717/171 |
| 9,088,489 B2 * | 7/2015 | Kennedy | ............. | H04L 12/1457 |
| 2003/0126236 A1 * | 7/2003 | Marl | ................. | H04L 29/08846 709/220 |
| 2006/0095903 A1 * | 5/2006 | Cheam | ...................... | G06F 8/67 717/168 |
| 2011/0145803 A1 * | 6/2011 | Soderstedt | ................ | G06F 8/66 717/154 |
| 2012/0014056 A1 * | 1/2012 | Chen | ...................... | F16M 11/08 361/679.41 |
| 2012/0042035 A1 * | 2/2012 | Kennedy | ............. | H04L 12/1457 709/217 |
| 2012/0072895 A1 * | 3/2012 | Koyama et al. | .............. | 717/168 |
| 2012/0084766 A1 * | 4/2012 | Shanmugam | ............. | G06F 8/65 717/173 |
| 2012/0180034 A1 * | 7/2012 | Hatamoto | ................. | G06F 8/65 717/168 |
| 2013/0019236 A1 | 1/2013 | Nakagawa et al. | | |
| 2013/0174137 A1 * | 7/2013 | Kim | .......................... | G06F 8/65 717/171 |
| 2013/0308055 A1 | 11/2013 | Shigemasa et al. | | |

FOREIGN PATENT DOCUMENTS

| | | |
|---|---|---|
| JP | 2002-176582 | 6/2002 |
| JP | 2005-182265 | 7/2005 |
| JP | 2012-084118 | 4/2012 |
| JP | 2013-020506 | 1/2013 |
| JP | 2013-242357 | 12/2013 |

OTHER PUBLICATIONS

Bing, B., "A Fast and Secure Framework for Over-the-Air Wireless Software Download Using Reconfigurable Mobile Devices", IEEE Communications Magazine, vol. 44, Issue 6 [onine], 2006 [retrieved May 11, 2016], Retrieved from Internet: <URL: http://users.ece.gatech.edu/~benny/OTAdownload.pdf>, pp. 58-63.*

* cited by examiner

*Primary Examiner* — Todd Aguilera
(74) *Attorney, Agent, or Firm* — Oblon, McClelland, Maier & Neustadt, L.L.P.

(57) ABSTRACT

A terminal is connected to a terminal management device and an update management device. The terminal includes: a determination request unit configured to request the terminal management device to determine whether or not an update of a program is executable; an acquisition unit configured to, when the determination request unit receives information indicating that the terminal is able to execute an update of a program, acquire an update program used for executing an update of the program from the update management device; and an updating unit configured to execute the update program received from the update management device.

14 Claims, 17 Drawing Sheets

FIG.3

| ID | PASSWORD |
|---|---|
| 01aa | aaaa |
| 01ab | abab |
| 01ba | baba |
| ... | ... |

FIG.4

| ID | NAME | OPERATION STATE | COMMUNI-CATION STATE | RECEPTION DATE AND TIME | IP ADDRESS OF TERMINAL | TYPE INFOR-MATION | ID STATE |
|---|---|---|---|---|---|---|---|
| 01aa | JAPAN, TOKYO OFFICE, AA TERMINAL | ON LINE (COMMUNICA-TION READY) | None | 2009.11.10.13:40 | 1.2.1.3 | A1 | VALID |
| 01ab | JAPAN, TOKYO OFFICE, AB TERMINAL | OFF LINE | | 2009.11.09.12:00 | 1.2.1.4 | A2 | INVALID |
| ... | ... | ... | ... | ... | ... | ... | ... |
| 01ba | JAPAN, OSAKA OFFICE, BA TERMINAL | ON LINE (BUSY) | Calling | 2009.11.10.13:45 | 1.2.2.3 | B1 | VALID |
| 01bb | JAPAN, OSAKA OFFICE, BB TERMINAL | ON LINE (BUSY) | Private Busy | 2009.11.10.13:50 | 1.2.2.4 | B2 | VALID |
| ... | ... | ... | ... | ... | ... | ... | ... |
| 01ca | U.S., NEW YORK OFFICE, CA TERMINAL | OFF LINE | | 2009.11.10.12:45 | 1.3.1.3 | A1 | VALID |
| 01cb | U.S., NEW YORK OFFICE, CB TERMINAL | OFF LINE | | 2009.11.10.13:55 | 1.3.1.4 | A1 | INVALID |
| ... | ... | ... | ... | ... | ... | ... | ... |
| 01da | U.S., WASHINGTON OFFICE, DA TERMINAL | ON LINE (BUSY) | Busy | 2009.11.08.12:45 | 1.3.2.3 | B1 | VALID |
| 01db | U.S., WASHINGTON OFFICE, DB TERMINAL | ON LINE (COMMUNICA-TION READY) | None | 2009.11.10.12:45 | 1.3.2.4 | B1 | VALID |
| ... | ... | ... | ... | ... | ... | ... | ... |

| TYPE INFORMATION | POWER SUPPLY CONFIRMATION NECESSITY |
|---|---|
| A1 | NO |
| A2 | NO |
| B1 | YES |
| B2 | YES |

TERMINAL, TERMINAL SYSTEM, AND NON-TRANSITORY COMPUTER-READABLE MEDIUM FOR UPDATING A TERMINAL USING MULTIPLE MANAGEMENT DEVICES

CROSS-REFERENCE TO RELATED APPLICATIONS

The present application claims priority to and incorporates by reference the entire contents of Japanese Patent Application No. 2013-065093 filed in Japan on Mar. 26, 2013 and Japanese Patent Application No. 2014-052747 filed in Japan on Mar. 14, 2014.

BACKGROUND OF THE INVENTION

1. Field of the Invention

The present invention relates to a terminal, a terminal system, and a non-transitory computer-readable medium.

2. Description of the Related Art

In recent years, terminal systems in which terminals communicate to each other via a network such as the Internet have been prevalent. For example, in a remote conference system, a destination terminal is specified and a call is started and thus the image data and the voice data are transmitted and received, so that a teleconference can be made. Further, by collectively managing the IDs associated with the terminals at a management server, the terminals managed by the server only can be used to perform the teleconference.

In this type of terminal, there are two forms, in one of which the AC power supply and the like is connected for the use and in the other of which not only a power supply I/F for the connection to an external power supply such as the AC power supply but also an internal power supply such as a battery is embedded so that the terminal can be carried.

Further, in this type of terminal, the firmware (program) may be periodically updated for the improvement of the communication confidentiality performance, the operational performance, and the like. At the update, because the firmware itself for carrying out the teleconference is updated, the function of the teleconference cannot be executed during the update process (for example, when there is a call from the other party, the call cannot be accepted). Therefore, the update process may be made independently of the management server that manages the teleconference. For example, it has been known that an update server for performing the update is provided separately from the management server and the update is made independently of making the teleconference. Further, it has already been known that there is a form that the user can select the execution of the update.

Japanese Patent Application Laid-open No. 2012-084118 discloses the invention of a communication device, an update method, and a program that allows the user to select the execution of the update for the convenience at the user when there is an update to be executed in the communication device.

Conventionally, however, there has been a problem that unnecessary update process is performed because the update process at the terminal is performed independently of the management server that collectively manages the terminals by the IDs of the terminals. For example, the terminal which is no longer managed by the management server or the terminal where the provision of the service is invalid (the contract has expired) can execute the update, which causes unnecessary load for the terminal system.

Therefore, it is desirable to provide a terminal, a terminal system, and a non-transitory computer-readable medium that is able to prevent the execution of the unnecessary update process of the terminal.

SUMMARY OF THE INVENTION

It is an object of the present invention to at least partially solve the problems in the conventional technology.

According to an aspect of the present invention, there is provided a terminal connected to a terminal management device and an update management device, the terminal including: a determination request unit configured to request the terminal management device to determine whether or not an update of a program is executable; an acquisition unit configured to, when the determination request unit receives information indicating that the terminal is able to execute an update of a program, acquire an update program used for executing an update of the program from the update management device; and an updating unit configured to execute the update program received from the update management device.

According to another aspect of the present invention, there is provided a terminal system including: one or more terminals; a terminal management device configured to manage information of the terminal; and an update management device configured to manage an update of a program of the terminal, wherein the terminal includes: a determination request unit configured to request the terminal management device to determine whether or not an update of a program is executable; an acquisition unit configured to, when the determination request unit receives information indicating that the terminal is able to execute an update of a program, acquire an update program used for executing an update of the program from the update management device; and an updating unit configured to execute the update program received from the update management device.

According to still another aspect of the present invention, there is provided a non-transitory computer-readable medium comprising computer readable program codes, performed by a terminal connected to a terminal management device and an update management device, the program codes when executed causing the computer to execute: requesting, by a determination request unit, the terminal management device to determine whether or not an update of a program is executable; when the determination request unit receives information indicating that the terminal is able to execute an update of a program, acquiring, by an acquisition unit, an update program used for executing an update of the program from the update management device; and executing, by an updating unit, the update program received from the update management device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view illustrating an example of a terminal authentication management table of the first embodiment;

FIG. 4 is view illustrating an example of a terminal management table of the first embodiment;

DETAILED DESCRIPTION OF THE PREFERRED EMBODIMENTS

By referring to the attached drawings, described below will be embodiments of a terminal, a terminal system, and a program.

First Embodiment

Figure 1:
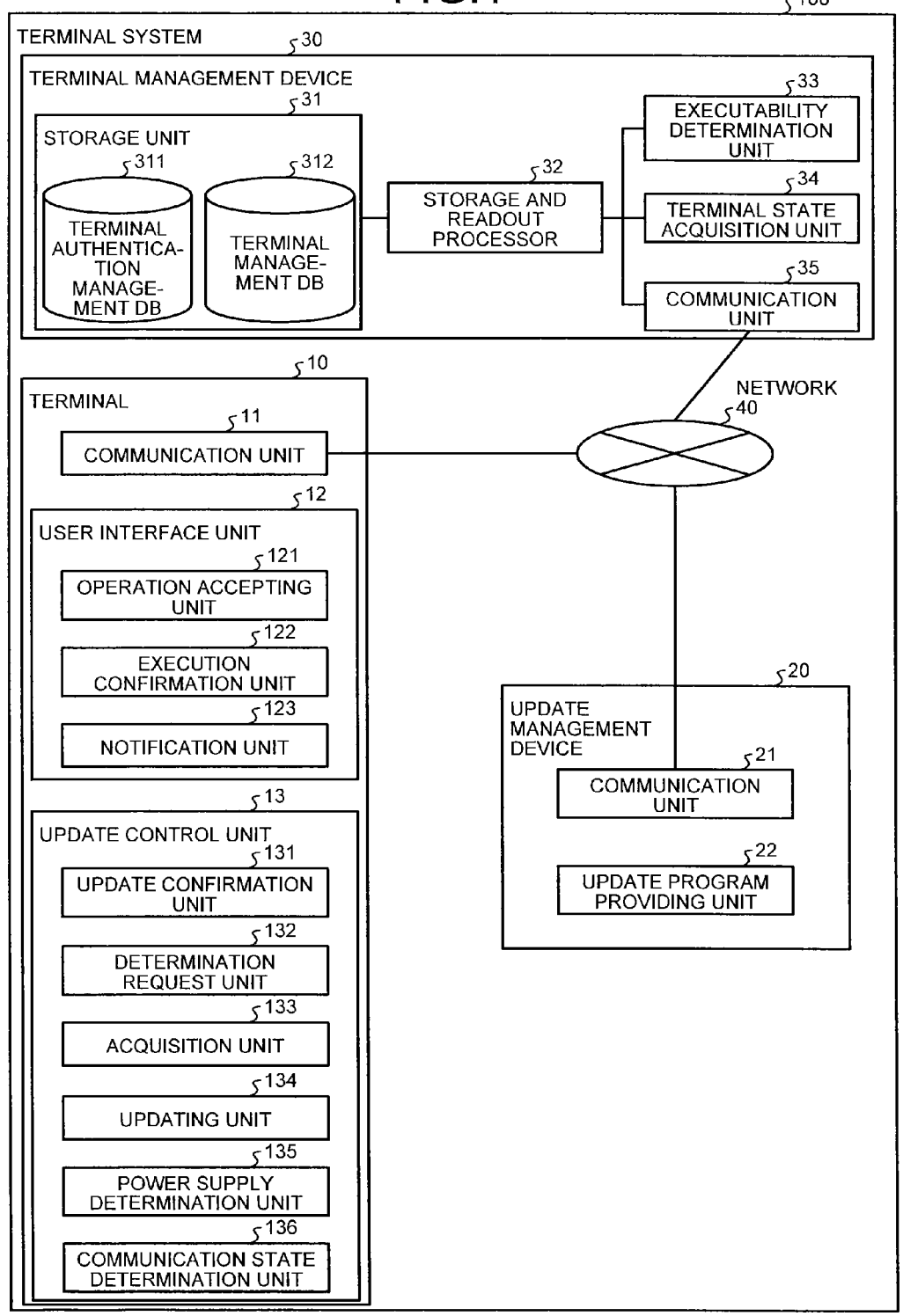
FIG. 1 is a view illustrating an example of a functional block of a terminal system of a first embodiment.

FIG. 1 is a view illustrating an example of the functional block of a terminal system 100 of the first embodiment. The terminal system 100 of the present embodiment includes a terminal 10, an update management device 20, and a terminal management device 30.

The terminal system 100 may be any system as long as the communication system in which the terminals 10 are able to communicate to each other. For example, it may be a television (video) conference system, an audio conference system, an audio telephone system (including a mobile phone system), a text chat system, a white board sharing system, or the like. The terminal 10 may be a dedicated terminal for the above-described communication system, or may be a general terminal such as a personal computer, a smartphone, a tablet-type terminal, or the like.

Figure 2:
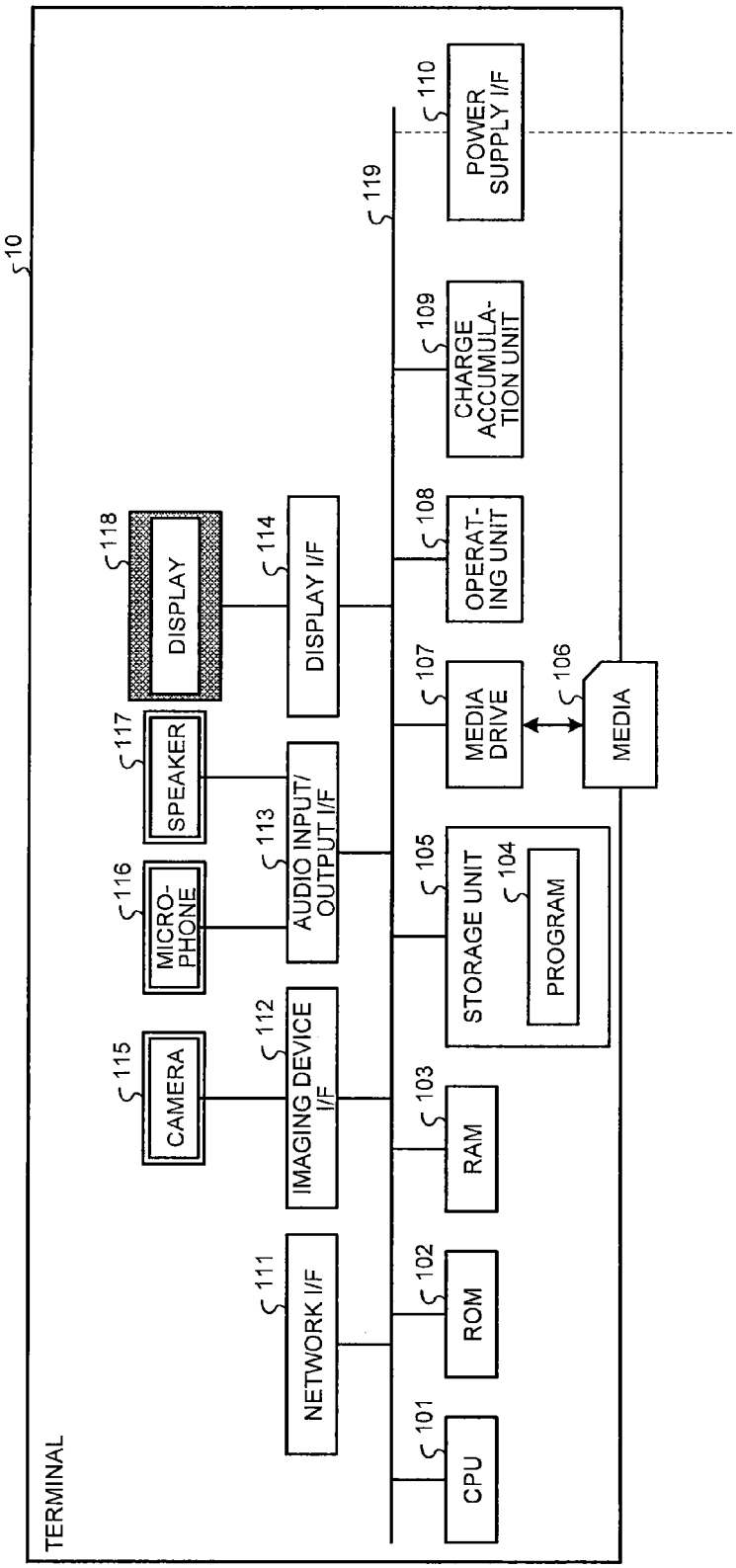
FIG. 2 is a view illustrating an example of a hardware configuration of a terminal of the first embodiment.

FIG. 2 is a view illustrating an example of a hardware configuration of the terminal 10 of the first embodiment. As illustrated in FIG. 2, the terminal 10 includes a CPU 101 (Central Processing Unit), ROM 102 (Read Only Memory), RAM 103 (Random Access Memory), a storage unit 105, a media drive 107, an operating unit 108, a charge accumulation unit 109, a power supply I/F 110, a network I/F 111, an imaging device I/F 112, an audio input/output I/F 113, and a display I/F 114, and each section is connected to each other by a bus 119.

The CPU 101 controls the operation of the terminal 10 in a centralized manner by developing a program stored in the ROM 102 and/or the storage unit 105 to the RAM 103 to sequentially execute it. The storage unit 105 is an HDD (Hard Disk Drive), an SSD (Solid State Drive), or the like, and stores data in a readable/writable manner. Specifically, the storage unit 105 stores the program 104 and/or various setting information to be executed by the CPU 101. In the update, the program 104 and/or various setting information stored in the storage unit 105 is updated. It is noted that, in the present embodiment, description will be provided assuming that the program 104 is the object to be updated.

The media drive 107 is a drive device that performs reading out from/writing to the media 106 such as an optical disk. The operating unit 108 is a keyboard, various operating keys, a touch panel laminated on a display 118, or the like, and accepts the operation input of the user.

The charge accumulation unit 109 is a battery and the like of the terminal 10. The power supply I/F 110 is an interface adapted to be connected to the power supply of the AC power supply and the like. In the terminal 10 of the present embodiment, the electric power is supplied from the power supply or the charge accumulation unit 109. Specifically, when the terminal 10 is connected to the power supply, the electric power is supplied from the power supply to the terminal 10. When the terminal 10 is not connected to the power supply, the electric power is supplied from the charge accumulation unit 109 to the terminal 10.

The network I/F 111 is an interface adapted to be connected to the network 40 (see FIG. 1) to perform data communication. The imaging device I/F 112 is an interface adapted to be connected to a camera 115 that is a digital camera for obtaining an image photographed by the camera 115. The audio input/output I/F 113 is an interface adapted to be connected to a microphone 116 and a speaker 117 for the audio input by the microphone 116 and the audio output via the speaker 117. The display I/F 114 is an interface adapted to be connected to the display 118 such as an LCD (Liquid Crystal Display) to output the display data to the display 118.

It is noted that, although the display 118 is used in the present embodiment, other display equipment such as a projector may be connected in place of the display 118. Furthermore, the camera 115 and the microphone 116 are not necessarily incorporated, and they may be connected externally.

Turning back to FIG. 1, the update management device 20 is a device that manages the update program for updating the program 104 of the terminal 10. The terminal management device 30 is a device that manages the information of the terminal 10.

The terminal 10, the update management device 20, and the terminal management device 30 are connected to each other by the network 40. It is noted that the communication system of the network 40 may be a wired system or may be a radio system. Further, the network 40 may be implemented by the combination of the wired system and the radio system. It is noted that the terminal system 100 may include a plurality of the terminals 10, the update management devices 20, and the terminal management devices 30, respectively. For example, a plurality of terminals 10 may be provided and a plurality of users may simultaneously communicate with the update management device 20 and the terminal management device 30. Alternatively, it may be configured with a plurality of the update management devices 20 and the terminal management devices 30 for the reason of load distribution.

The terminal 10 includes a communication unit 11, a user interface unit 12, and an update control unit 13. The update control unit 13 includes an update confirmation unit 131, a determination request unit 132, an acquisition unit 133, an updating unit 134, a power supply determination unit 135, and a communication state determination unit 136. The user interface unit 12 includes an operation accepting unit 121, an execution confirmation unit 122, and a notification unit 123.

The update management device 20 includes a communication unit 21 and an update program providing unit 22. The terminal management device 30 includes a storage unit 31, a storage and readout processor 32, an executability determination unit 33, a terminal state acquisition unit 34, and a communication unit 35. The storage unit 31 stores a terminal authentication management DB 311 and a terminal management DB 312.

Below, each function block will be described along the flow of the process of updating the program 104 of the terminal 10 of the present embodiment. Firstly, the update confirmation unit 131 of the terminal 10 confirms to the update management device 20 as to whether or not there is an update of the program 104 of the terminal 10 via the communication unit 11. The update program providing unit 22 of the update management device 20 transmits, to the terminal 10 via the communication unit 21, the information indicating whether or not there is an update of the program 104 of the terminal 10.

The determination request unit 132 of the terminal 10 receives, from the update management device 20, the information indicating whether or not there is an update of the program 104 of the terminal 10. When there is an update of the program 104, the execution confirmation unit 122 confirms to the user of the terminal 10 as to whether or not to execute the update of the program 104. When the operation accepting unit 121 has accepted the operation indicating that the update of the program 104 is selected from the user of the terminal 10, the determination request unit 132 requests the terminal management device 30 to determine whether or not the terminal 10 is ready to execute the update. It is noted that, when there is an update of the program 104 of the terminal 10, the determination request unit 132 may request the terminal management device 30 for the determination without confirming to the user by the execution confirmation unit 122.

The executability determination unit 33 of the terminal management device 30 authenticates the terminal 10 by referring to the terminal authentication management DB 311 of the storage unit 31 via the storage and readout processor 32. The terminal state acquisition unit 34 acquires type information of the terminal 10 by referring to the terminal management DB 312 of the storage unit 31 via the storage and readout processor 32. The communication unit 35 then transmits the executability of the update by the terminal and the type information of the terminal 10 to the terminal 10 which has requested the determination.

Figure 3:
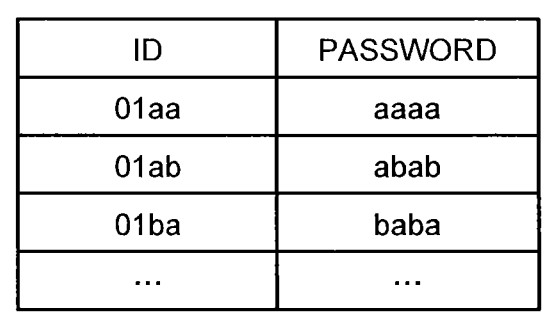

Firstly, described will be the determination of whether or not the terminal 10 is ready to execute the update. FIG. 3 is a view illustrating an example of the terminal authentication management table of the first embodiment. The record of the terminal authentication management table has an ID and a password. The ID is information for identifying the terminal 10. The ID may be identification information (a terminal ID) uniquely allocated to the terminal, or may be identification information (a user ID) uniquely allocated to the user. The password is a password that is necessary to use that ID to connect itself to the terminal management device 30.

It is noted that, when there is an update of the program 104 of the terminal 10, the determination request unit 132 may not instruct the user of the terminal 10 to input the ID and the password, which would be necessary for the determination, when requesting the determination of the executability of the update to the terminal management device 30. That is, the determination request unit 132 may use the ID and the password stored in the terminal 10 to request the determination to the terminal management device 30.

Next, the type information of the terminal 10 will be described. FIG. 4 is a view illustrating an example of the terminal management table of the first embodiment. The example of FIG. 4 is the example where the terminal 10 is the terminal used for the teleconference. The record of the terminal management table has ID, name, operation state, communication state, reception data and time, terminal IP address, and state of the type information and the ID. The ID is information for identifying the terminal 10. The name may be the name of the terminal 10 or may be the name of the user.

The operation state represents the operating state of the terminal 10. The operation state includes an ON line that is the state where the communication is ready or the communication is ongoing, and an OFF line that is the state where the communication is not ready such as when the power supply is turned off.

The communication state represents the communication state of the terminal 10. The communication state includes a state of calling another terminal 10, that is, a "Calling" that represents a state of waiting for the response to the transmission of the initiation request information of the session used in the teleconference to another terminal 10, a state of being called from another terminal 10, that is, a "Ringing" that represents a state where the initiation request information has been received from another terminal 10 and the response to the received initiation request information has not been completed, an "Accepted" that represents a state where the permission response has been completed to the initiation request information from another terminal 10 but the session establishment has not yet been completed and the state where the permission response has been completed to the initiation request information that has been transmitted by the self terminal but the session establishment has not yet been completed, a "Busy" that represents a state where the session with another terminal 10 has been established and the content data in the teleconference is under transmission, and a "None" that represents a state where it has no communication with other terminal and is in a standby.

It is noted that the above-described communication states are the states corresponding to the sessions without participation restriction that have been established in response to the initiation request information containing the restriction information indicating no participation-restriction being applied. Furthermore, in the terminal management device 30 according to the embodiment, the states corresponding to the sessions with participation restriction that have been established in response to the initiation request information containing the restriction information indicating the participation restriction being applied are managed as the different communication state from the communication state corresponding to the session without the participation restriction. That is, there are a "Private Calling", a "Private Ringing", a "Private Accepted", and a "Private Busy" as the communication states corresponding to the sessions with the participation restriction that correspond respectively to the "Calling", the "Ringing", the "Accepted", the "Busy" for the sessions without the participation restriction. Therefore, in the terminal system 100 according to the present embodiment, the communication states are classified and managed according to whether or not there is a participation restriction, so that whether or not there is a participation restriction can be identified according to the communication state.

The reception date and time represents the time when the terminal 10 is connected to the terminal management device 30. The IP address of the terminal represents an IP address of the terminal 10. The type information indicates the type according to the model of the terminal 10. The state of the ID indicates whether the ID is valid or invalid.

Turning back to FIG. 1, the executability determination unit 33 transmits, to the terminal 10 via the communication unit 35, the information indicating whether or not the terminal 10 is able to execute the update and, if so, the type information of the terminal 10. In response that the determination request unit 132 of the terminal 10 receives the information indicating whether or not the terminal 10 is able to execute the update and the type information of the terminal 10, the power supply determination unit 135 refers to the power supply confirmation necessity table to confirm whether or not it is necessary to determine whether or not the terminal 10 is connected to the power supply.

Figures 5, 6:
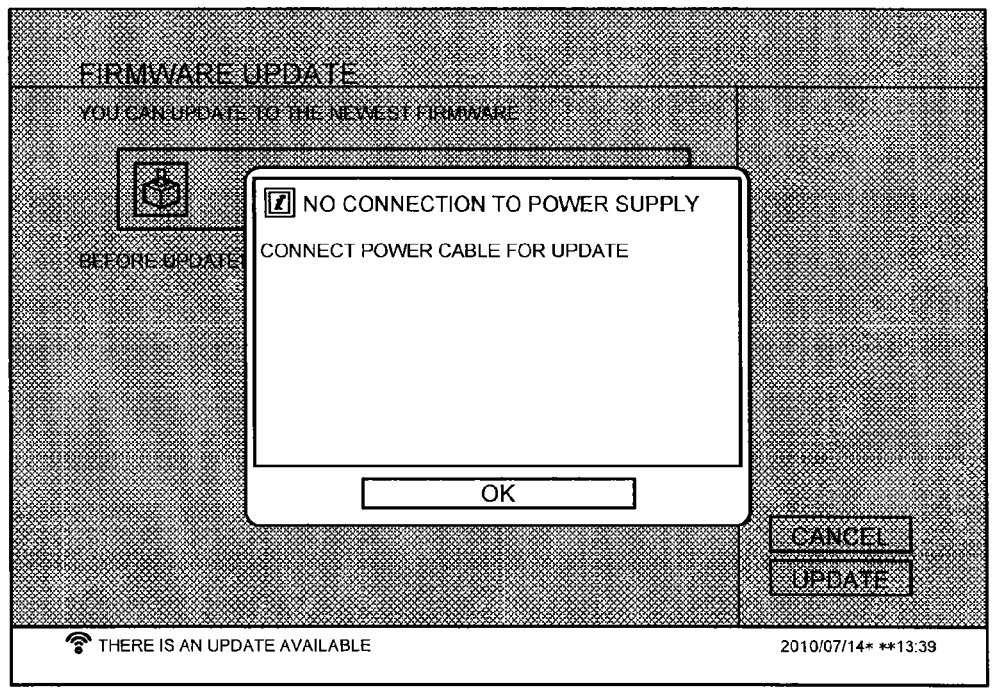
FIG. 5 is a view illustrating an example of a power supply confirmation necessity table of the first embodiment.
FIG. 6 is a view illustrating an example of an alert screen of the first embodiment.

FIG. 5 is a view illustrating an example of the power supply confirmation necessity table of the first embodiment. The record of the power supply confirmation necessity table has the type information and the power supply confirmation necessity. The type information indicates the type according to the model of the terminal 10. The power supply confirmation necessity indicates whether or not it is necessary to confirm from which the power is supplied.

Turning back to FIG. 1, when it is necessary to determine whether or not the power supply is connected, the power supply determination unit 135 determines whether or not the terminal 10 is connected to the power supply. When the terminal 10 is connected to the power supply, the acquisition unit 133 acquires, from the update management device 20, the update program used for executing the update of the program 104. The updating unit 134 then executes the update program received from the update management device 20.

When the terminal 10 is not connected to the power supply, the communication state determination unit 136 determines whether or not the terminal 10 is performing wired communication. Further, the power supply determination unit 135 determines the residual power amount of the charge accumulation unit 109 (see FIG. 2). When the terminal 10 is performing the wired communication and the residual power amount of the charge accumulation unit 109 is greater than or equal to a predetermined threshold, the acquisition unit 133 acquires the update program used for executing the updating of the program 104 from the update management device 20 even when the terminal 10 is not connected to the power supply. The updating unit 134 then executes the update program received from the update management device 20.

Here, the reason why the terminal 10 of the present embodiment determines the power supply and the communication state will be described. In general, the terminal 10 performing the wired communication can enjoy a better communication speed and stability compared to the case of performing the radio communication. Therefore, when the terminal 10 is performing the wired communication and the residual power amount of the charge accumulation unit 109 of the terminal 10 is greater than or equal to the predetermined threshold, there is quite small likelihood that the update process would fail due to the power shortage during the execution of the update program. The determination of the power supply and the communication state allows the terminal 10 of the present embodiment to prevent the operation failure of the terminal 10 due to the failure of the update process and the occurrence of unnecessary load of the terminal system 100 due to the retry of the update process.

It is noted that, when the terminal 10 is not connected to the power supply, the program 104 of the terminal 10 may not be updated uniformly without determining the communication state and the residual power amount. When the updating unit 134 is unable to execute the update program, it notifies the user of the terminal 10 of the information indicating that the update program cannot be executed.

FIG. 6 is a view illustrating an example of an alert screen of the first embodiment. The example in FIG. 6 is the alert screen for notifying the user of the information indicating that the program 104 of the terminal 10 is unable to be updated. The alert screen includes a message display part for notifying the user of the information indicating the reason for the update being unable to be done, the procedure necessary for executing the update, and the like and an operating button for accepting that the user has confirmed the message.

Figure 7:
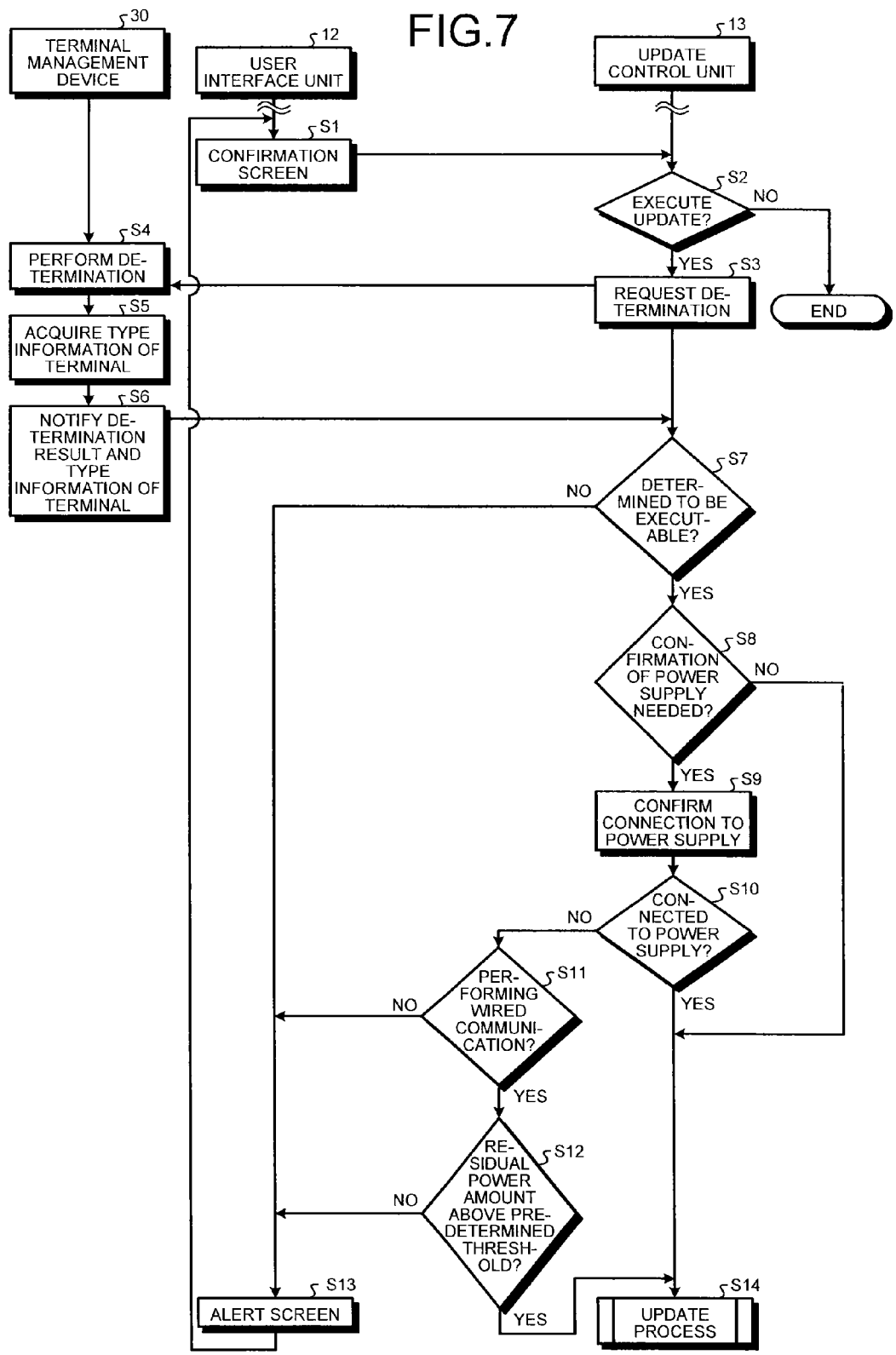
FIG. 7 is a flowchart illustrating an example of an updating control method (the entire flow) of a program of the terminal of the first embodiment.

FIG. 7 is a flowchart illustrating an example of an update control method (the entire flow) of the program 104 of the terminal 10 of the first embodiment. When there is an update of the program 104, the user interface unit 12 (the execution confirmation unit 122) displays the confirmation screen on the display 118 to confirm to the user of the terminal 10 as to whether or not to execute the update of the program 104 (step S1). The update control unit 13 determines whether or not to execute the update (the update program) based on which of "execute" or "not execute" is selected on the confirmation screen (step S2). If "execute" is selected (step S2, Yes), the update control unit 13 (the determination request unit 132) transmits the ID and the password to the terminal management device 30 and requests the determination as to whether or not the terminal 10 is able to execute the update (step S3). If "not execute" is selected (step S2, No), the update control process ends.

The terminal management device 30 (the executability determination unit 33) refers to the terminal authentication management DB 311 of the storage unit 31 to determine whether or not the terminal 10 is able to execute the update (determines whether or not the ID of the terminal 10 is valid) (step S4). If the terminal 10 is able to execute the update, the terminal management device 30 (the terminal state acquisition unit 34) refers to the terminal management DB 312 of the storage unit 31 to acquire the type information of the terminal 10 (step S5). The terminal management device 30 (the communication unit 35) transmits, to the terminal 10 that has requested the determination, the executability of the update of the terminal and, if the update is executable, the type information of the terminal 10 (step S6).

The update control unit 13 (the determination request unit 132) determines whether or not it has been determined by the terminal management device 30 that the update is executable (step S7). If it has been determined to be executable (step S7, Yes), step S8 is entered. If it has not been determined to be executable (step S7, No), the user interface unit 12 (the notification unit 123) displays on the display 118 the alert screen that notifies the user that the terminal 10 has not been determined to be executable (step S13).

The update control unit 13 (the power supply determination unit 135) determines whether or not it is necessary to confirm that the power supply is connected, by referring to the type information of the terminal 10 received from the terminal management device 30 and the power supply confirmation necessity table (step S8). If it is necessary to confirm that the power supply is connected (step S8, Yes), the update control unit 13 (the power supply determination unit 135) confirms whether or not the power supply is connected (step S9). If it is not necessary to confirm whether or not the power supply is connected (step S8, No), the update control unit 13 (the updating unit 134) executes the update process (step S14). It is noted that the update process will be described later.

If the power supply is connected (step S10, Yes), the update control unit 13 (the updating unit 134) executes the update process (step S14). If the power supply is not connected (step S10, No), step S11 is entered.

The update control unit 13 (the communication state determination unit 136) determines whether or not the terminal 10 is performing wired communication (step S11). If the terminal 10 is performing the wired communication (step S11, Yes), step S12 is entered. If the terminal 10 is not performing the wired communication (step S11, No), it means that the terminal 10 is not connected to the power supply, so that the alert screen notifying the user that the update is not executable is displayed on the display 118 if the terminal 10 is not in the wired communication (step S13).

The update control unit 13 (the power supply determination unit 135) determines whether or not the residual power amount of the charge accumulation unit 109 is greater than or equal to a predetermined threshold (step S12). The predetermined threshold is defined by, for example, that (the residual power amount of the charge accumulation unit 109)/(the power capacity of the charge accumulation unit 109) is 80% or more. If the residual power amount is greater than or equal to the predetermined threshold (step S12, Yes), the update control unit 13 (the updating unit 134) executes the update process (step S14). If the residual power amount is not greater than the predetermined threshold (step S12, No), the alert screen notifying the user that the update is not executable is displayed on the display 118, because the terminal 10 is not connected to the power supply and the residual power amount of the charge accumulation unit 109 (the battery and the like) is insufficient (step S13).

After the alert screen is displayed by step S13, the process returns to step S1.

Figure 8:
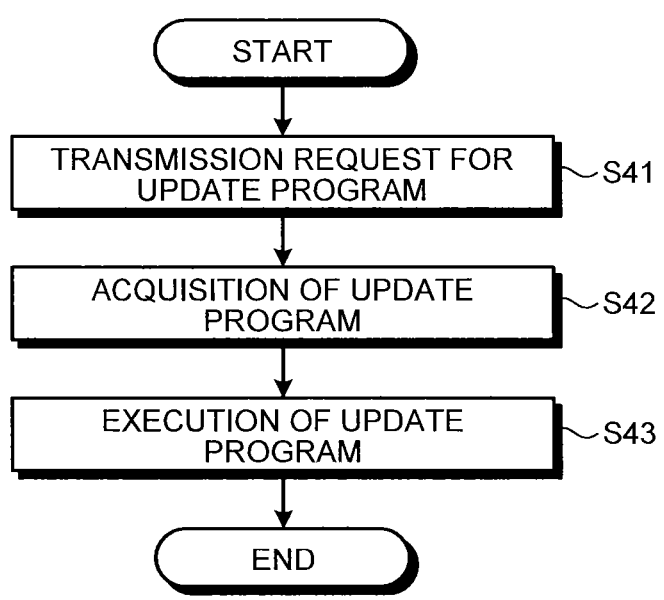
FIG. 8 is a flowchart illustrating an example of an update (updating) process of the program of the terminal of the first embodiment.

FIG. 8 is a flowchart illustrating an example of the update (updating) process of the program 104 of the terminal 10 of the first embodiment. The acquisition unit 133 requests the update management device 20 for the transmission of the update program (step S41). The acquisition unit 133 acquires the update program by receiving the update program from the update management device 20 (step S42). The updating unit 134 executes the update program (step S43).

The terminal system 100 of the first embodiment allows for the prevention of the execution of unnecessary update process of the terminal.

Second Embodiment

Next, a terminal system 100 of the second embodiment will be described. The terminal system 100 of the present embodiment is different from the terminal system 100 of the first embodiment in that it requests the terminal management device 30 to determine whether or not the terminal 10 is able to execute the update before the update control unit 13 determines whether or not to execute the update. The functional block of the terminal system 100, the hardware configuration of the terminal 10, and the like of the present embodiment are the same as those of the terminal system 100 of the first embodiment, and thus their descriptions will be omitted.

Figure 9:
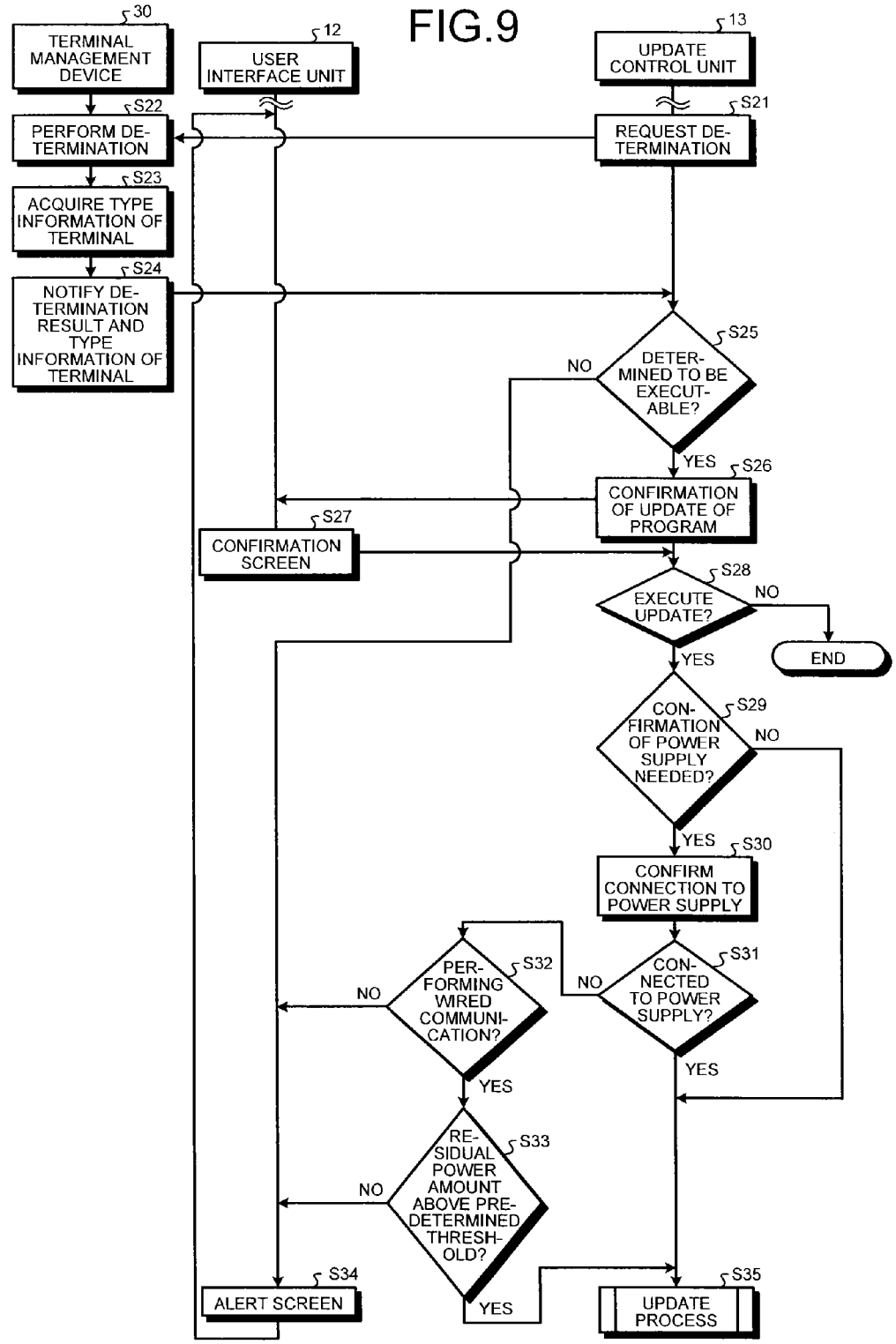
FIG. 9 is a flowchart illustrating an example of an update control method (the entire flow) of a program of a terminal of a second embodiment.

FIG. 9 is a flowchart illustrating an example of the update control method (the entire flow) of the program of the terminal 10 of the second embodiment. The update control unit 13 (the determination request unit 132) transmits the ID and the password of the terminal 10 to the terminal management device 30 and requests for the determination of whether or not the terminal 10 is able to execute the update (step S21).

The terminal management device 30 (the executability determination unit 33) refers to the terminal authentication management DB 311 of the storage unit 31 to determine whether or not the terminal 10 is able to execute the update (determines whether or not the ID of the terminal 10 is valid) (step S22). If it is determined that the terminal 10 is able to execute the update, the terminal management device 30 (the terminal state acquisition unit 34) refers to the terminal management DB 312 of the storage unit 31 to acquire the type information of the terminal 10 (step S23). The terminal management device 30 (the communication unit 35) transmits, to the terminal 10 that has requested the determination, the update executability of the terminal and, if the update is executable, the type information of the terminal 10 (step S24).

The update control unit 13 (the determination request unit 132) determines whether or not it has been determined by the terminal management device 30 that the update is executable (step S25). If it is determined to be executable (step S25, Yes), the control for confirming to the user as to whether or not to update the program 104 is performed (the display instruction and the like of the confirmation screen to the user interface unit 12) (step S26). If it is not determined to be executable (step S25, No), the user interface unit 12 (the notification unit 123) displays on the display 118 the alert screen notifying the user that the terminal 10 has not been determined to be executable (step S34).

The user interface unit 12 (the execution confirmation unit 122) displays the confirmation screen on the display 118 to confirm to the user of the terminal 10 as to whether or not to execute the update of the program 104 (step S27). The update control unit 13 determines whether or not to execute the update (the update program) based on which of "execute" or "not execute" is selected on the confirmation screen (step S28). If "execute" is selected (step S28, Yes), step S29 is entered. If "not execute" is selected (step S28, No), the update control process ends.

The subsequent processes (step S29 to step S35) are the same as those in the flowchart (step S8 to step S14) of the update process of the program of the terminal 10 of the first embodiment, and thus their description will be omitted.

The terminal system 100 of the second embodiment allows for the prevention of the execution of unnecessary update process of the terminal.

Third Embodiment

Next, a terminal system 100 of the third embodiment will be described. The terminal system 100 of the present embodiment is different from the terminal systems 100 of the first and the second embodiments in that the terminal 10 has a pre-download function and an automatic power-off function. The functional block of the terminal system 100 related to the update (updating) process, the hardware configuration of the terminal 10, and the like of the present embodiment are the same as those of the terminal system 100 of the first embodiment, and thus their descriptions will be omitted.

Firstly, the pre-download function of the terminal 10 will be described. The pre-download function is a function to download, in advance, data needed for an update and to perform the update on or after a pre-set date and time. This function prevents saturation of the traffic of a communication line due to congestion of download requests for the data needed for the update in the update management device 20 when the update becomes executable.

Next, the automatic power-off function of the terminal 10 will be described. Firstly, a standby state of the terminal 10 will be described. The terminal 10 enters the standby state when a predetermined condition is satisfied. The predetermined condition is, for example, that a user has not operated the terminal 10 for a predetermined time. The automatic power-off function of the terminal 10 is a function to automatically turns off the power supply when a predetermined time (for example, 15 minutes) has elapsed since the terminal 10 has entered the standby state. Incidentally, the terminal 10 is connected to the power supply even when the automatic power-off function is enabled, and the power supply of the terminal 10 is not turned off while the pre-download is being executed.

Figure 10:
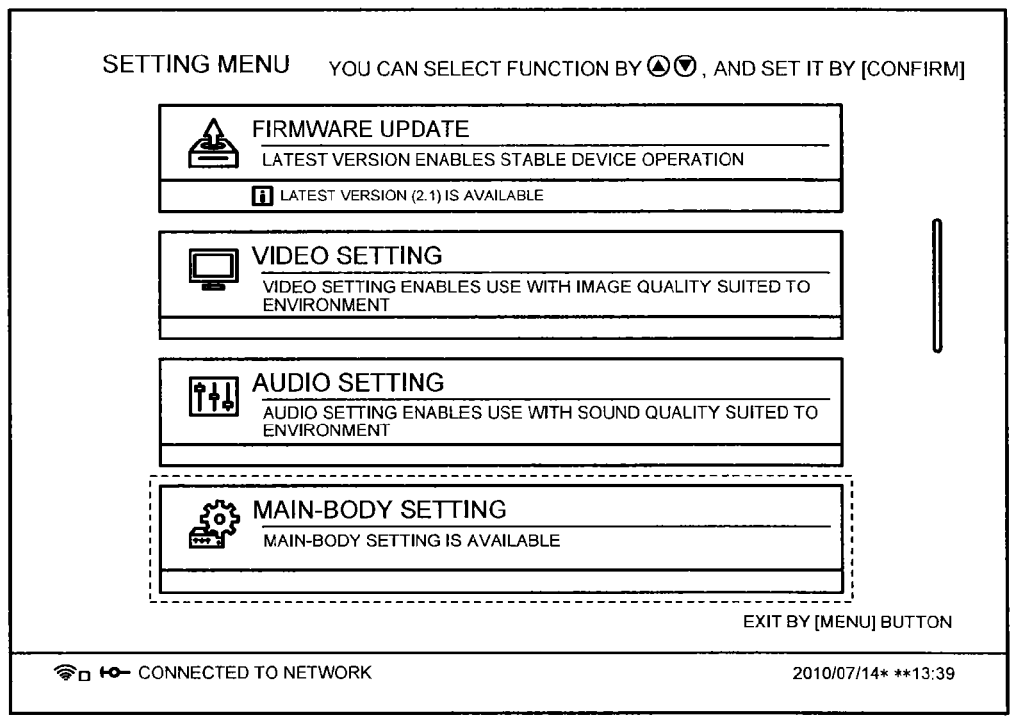
FIG. 10 is a view illustrating an example of a setting menu screen of a third embodiment.
Figure 11:
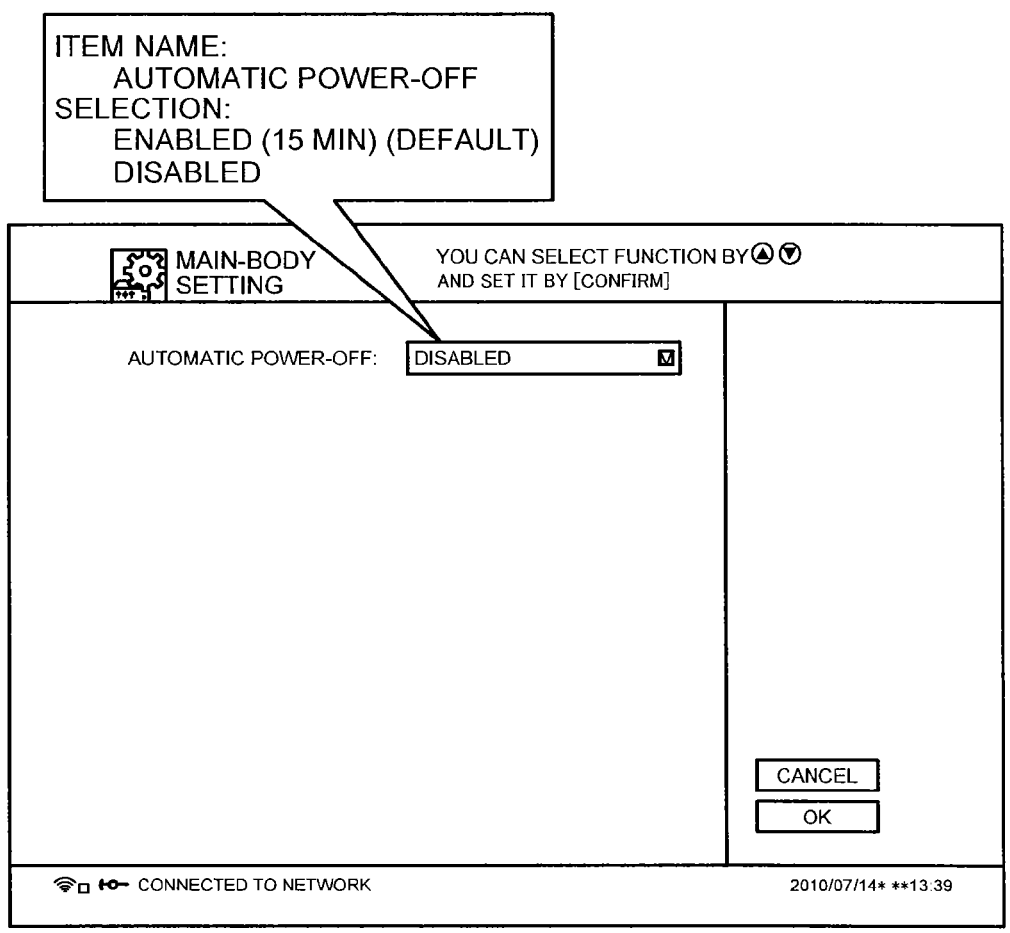
FIG. 11 is a view illustrating an example of a setting screen for an automatic power-off function of the third embodiment.

An automatic power-off function setting method will be described. FIG. 10 is a view illustrating an example of a setting menu screen of the third embodiment. FIG. 11 is a view illustrating an example of a setting screen for the automatic power-off function of the third embodiment. If main-body setting is selected from the setting menu in FIG. 10, the screen is changed to the setting screen for the automatic power-off function as illustrated in FIG. 11. In the example in FIG. 11, the automatic power-off function is set to be enabled or disabled by a drop-down list. If the automatic power-off is enabled, the power supply of the terminal 10 is automatically turned off when, for example, 15 minutes have elapsed since the terminal 10 has entered the standby state.

Figure 12:
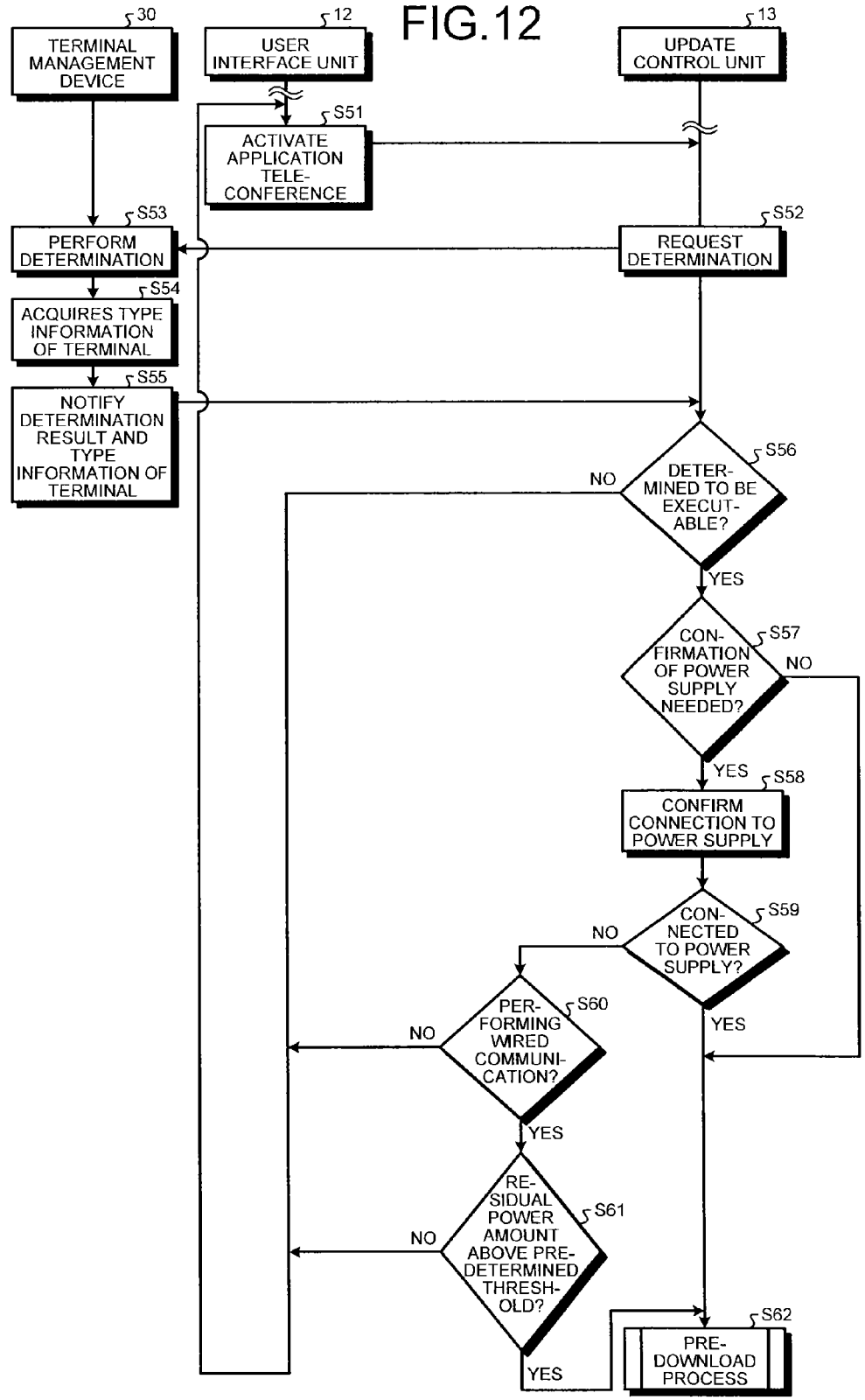
FIG. 12 is a flowchart illustrating an example of pre-download control method (the entire flow) of the third embodiment.

Next, a pre-download control method of the third embodiment will be described. FIG. 12 is a flowchart illustrating an example of the pre-download control method (the entire flow) of the third embodiment. The user interface unit 12 (the operation accepting unit 121) accepts the operation input to activate a teleconference application from a user of the terminal 10, and a start screen (site list screen) is displayed (Step S51).

Figure 13:
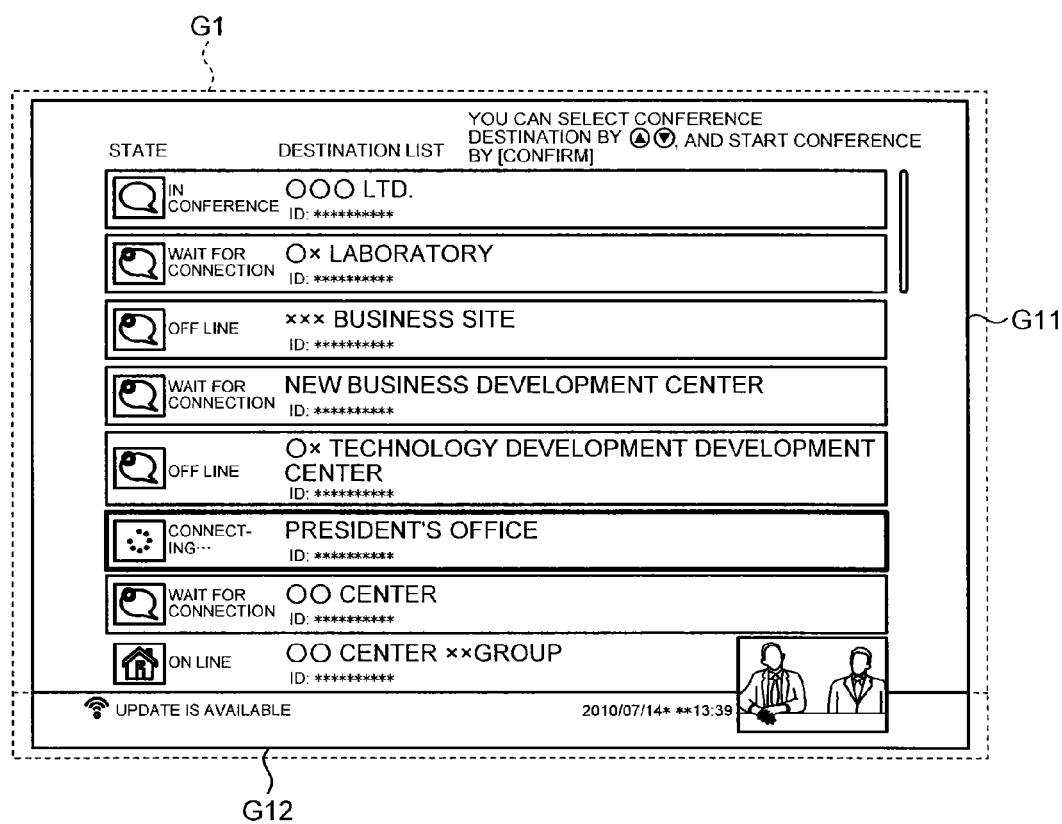
FIG. 13 is a view illustrating an example of a start screen (site list screen) of the third embodiment.

FIG. 13 is a view illustrating an example of a start screen (site list screen) G1 of the third embodiment. In FIG. 13, the start screen G1 includes a main screen G11 for displaying a list of communication states of the terminals 10 and a status screen G12 for displaying the status of the subject terminal. When there is an update, the user interface unit 12 displays, on the status screen G12, a notice indicating that there is an update. As the display for indicating that there is an update, it may be possible to display a pre-set icon image on the main screen G11, and the layout is not limited to the example illustrated in the drawings.

Turning back to FIG. 12, the flow for determining whether or not pre-download of data needed for an update is executable. Furthermore, the update control unit 13 (the determination request unit 132) transmits the ID and the password of the terminal 10 to the terminal management device 30 and requests determination as to whether or not the terminal 10 is able to execute the pre-download (Step S52).

The terminal management device 30 (the executability determination unit 33) then refers to the terminal authentication management DB 311 of the storage unit 31 to determine whether or not the terminal 10 is able to execute the pre-download (determines whether or not the ID of the terminal 10 is valid) (Step S53). If the terminal 10 is able to execute the pre-download according to the determination, the terminal management device 30 (the terminal state acquisition unit 34) refers to the terminal management DB 312 of the storage unit 31 to acquire the type information of the terminal 10 (Step S54). The terminal management device 30 (the communication unit 35) transmits, to the terminal that has requested the determination, the executability of the pre-download of the terminal and, if the pre-download is executable, the type information of the terminal 10 (Step S55).

The update control unit 13 (the determination request unit 132) determines whether or not the terminal management device 30 has determined that the pre-download is executable (Step S56). If it has been determined that the pre-download is executable (Step S56, Yes), the process proceeds to Step S57. If it has not been determined that the pre-download is executable (Step S56, No), the update control unit 13 (the acquisition unit 133) does not execute a pre-download process.

The update control unit 13 (the power supply determination unit 135) determines whether or not it is necessary to confirm that the power supply is connected, by referring to the type information of the terminal 10 received from the terminal management device 30 and the power supply confirmation necessity table (Step S57). If it is necessary to confirm that the power supply is connected (Step S57, Yes), the update control unit 13 (the power supply determination unit 135) confirms whether or not the power supply is connected (Step S58). If it is not necessary to confirm whether or not the power supply is connected (Step S57, No), the update control unit 13 (the acquisition unit 133) executes the pre-download process (Step S62). Incidentally, the pre-download process will be described in detail later.

If the power supply is connected (Step S59, Yes), the update control unit 13 (the acquisition unit 133) executes the pre-download process (Step S62). If the power supply is not connected (Step S59, No), the process proceeds to Step S60.

The update control unit 13 (the communication state determination unit 136) determines whether or not the terminal 10 is performing wired communication (Step S60). If the terminal 10 is performing the wired communication (Step S60, Yes), the process proceeds to Step S61. If the terminal 10 is not performing the wired communication (Step S60, No), the update control unit 13 (the acquisition unit 133) does not execute the pre-download process.

The update control unit 13 (the power supply determination unit 135) determines whether or not the residual power amount of the charge accumulation unit 109 is equal to or greater than a predetermined threshold (Step S61). The predetermined threshold is defined by, for example, that (the residual power amount of the charge accumulation unit 109)/(the power capacity of the charge accumulation unit 109) is 80% or more. If the residual power amount is equal to or greater than the predetermined threshold (Step S61, Yes), the update control unit 13 (the acquisition unit 133) executes the pre-download process (Step S62). If the residual power amount is not greater than the predetermined threshold (Step S61, No), the update control unit 13 (the acquisition unit 133) does not execute the pre-download process.

Figure 14:
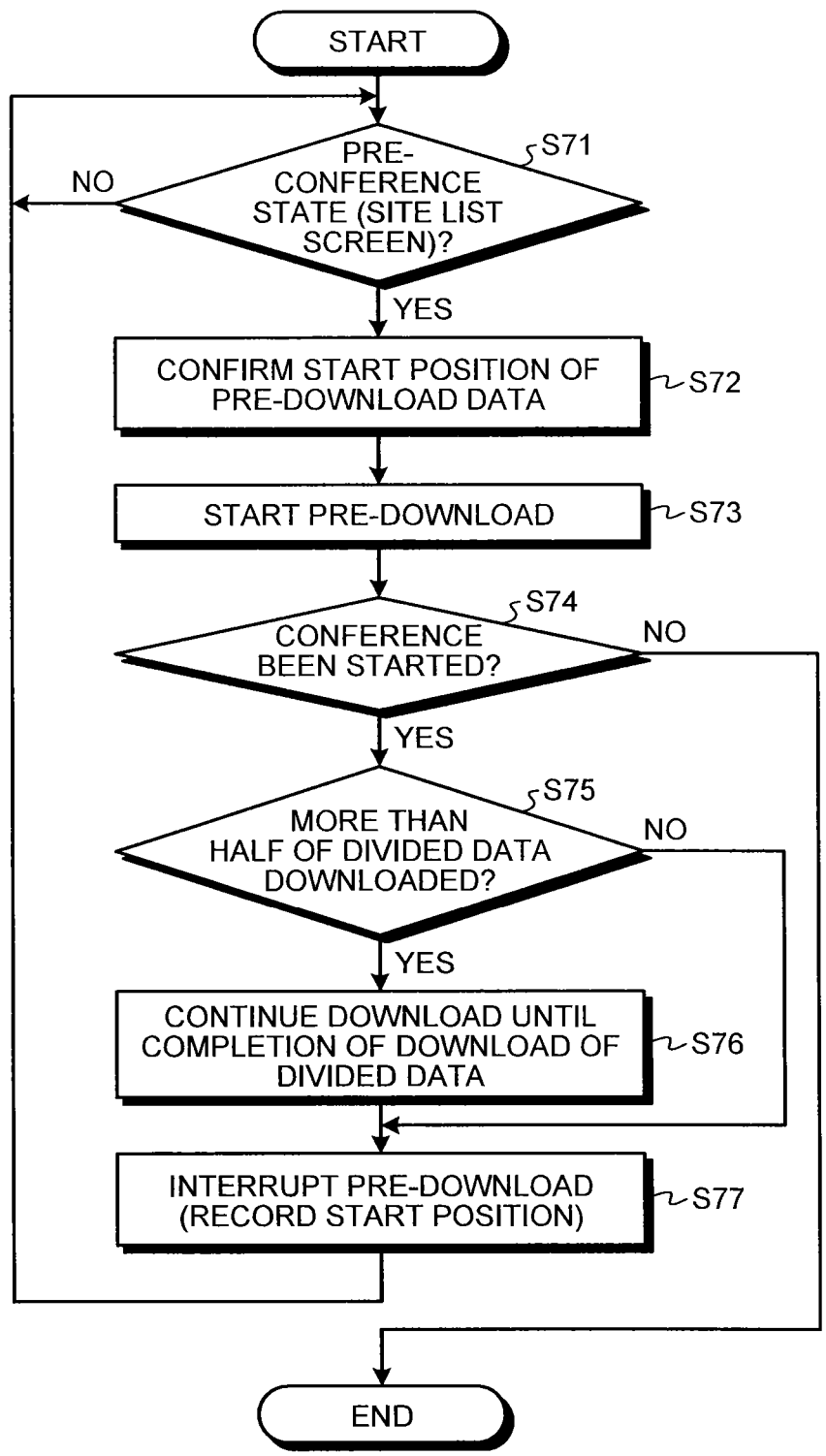
FIG. 14 is a flowchart illustrating an example of a pre-download process of a terminal of the third embodiment.

Next, the pre-download process of the terminal 10 will be described. FIG. 14 is a flowchart illustrating an example of the pre-download process of the terminal of the third embodiment.

The update control unit 13 (the acquisition unit 133) determines whether or not the state is a pre-teleconference state, in which a teleconference has not been started (Step S71). Specifically, when the pre-download is to be automatically executed, the pre-download needs to be executed in a state in which "the network bandwidth is not necessary", such as when a teleconference is not being performed. It is difficult to determine what process is being performed by each of the applications of the terminal 10 and what influence the process has on the network bandwidth. Therefore, to reliably distinguish the state in which a teleconference is not being performed and a function that uses the network bandwidth is not being executed, the update control unit 13 (the acquisition unit 133) distinguishes a situation in which the teleconference application is activated but a teleconference is not started. Namely, if the teleconference application is activated, it is determined that use of other applications that need the network bandwidth is eliminated, and, if the teleconference is not started, it is also determined that the network bandwidth is not greatly consumed.

If the state is not the pre-teleconference state (Step S71, No), that is, if the teleconference has been started by subsequent user operation, the update control unit 13 (the acquisition unit 133) does not start the pre-download process until the teleconference ends and the start screen (site list screen) is re-displayed.

If the state is the pre-teleconference state (Step S71, Yes), that is, if the start screen (site list screen) illustrated in FIG. 13 is being displayed, the update control unit 13 (the acquisition unit 133) confirms a start position of the pre-download to enable execution of the pre-download (Step S72), and then starts the pre-download (Step S73). The reason why the update control unit 13 confirms the start position of the pre-download is that the pre-download may have been interrupted and the pre-download is to be started (resumed) from the interrupted position.

Figure 15A:
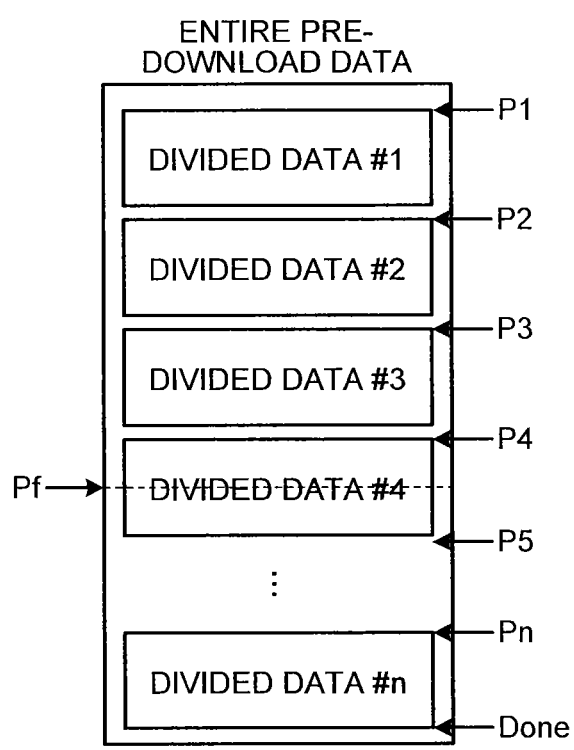
FIG. 15A is a view illustrating an example of pieces of divided data of pre-download and a start position to resume the pre-download in the third embodiment.
Figure 15B:
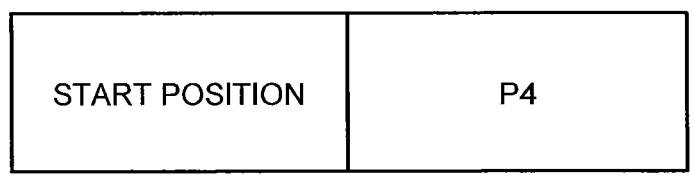
FIG. 15B is a view illustrating a download start position management table containing the start position.

FIG. 15B is a view illustrating a download start position management table containing the start position. The update control unit 13 refers to the download start position management table to confirm the start position.

Turning back to FIG. 14, the update control unit 13 (the acquisition unit 133) determines whether the teleconference has been started (Step S74). If the teleconference has not been started (Step S74, No), the update control unit 13 (the acquisition unit 133) continues the pre-download process until receiving all pieces of data needed for the update. If the update control unit 13 receives the all pieces of the data needed for the update, the pre-download process ends.

If the teleconference has been started (Step S74, Yes), the update control unit 13 (the acquisition unit 133) determines whether or not more than half of the pieces of divided data have been downloaded (Step S75).

If more than half of the pieces of the data have been downloaded (Step S75, Yes), the update control unit 13 (the acquisition unit 133) continues the download until the download of a piece of divided data being downloaded is finished (Step S76). The update control unit 13 (the acquisition unit 133) then interrupts the pre-download process upon completion of the download of the piece of the divided data being downloaded, and records a start (resume) position (Step S77).

If more than half of the pieces of the data have not been downloaded (Step S75, No), the update control unit 13 (the acquisition unit 133) immediately interrupts the pre-download process, and records a start (resume) position (Step S77).

FIG. 15A is a view illustrating an example of the pieces of the divided data (P1, P2, P3, P4, P5, . . . , PN) of the pre-download and the start position to resume the pre-download. Specifically, the update control unit 13 (the acquisition unit 133) determines what portion of the piece of the divided data being downloaded has been completed. In FIG. 15A, if a download complete position Pf is less than half of a piece of divided data #4, the update control unit 13 (the acquisition unit 133) cancels the download of the piece of the divided data #4 (discards the already-downloaded portion of the piece of the divided data #4), and stores a head position P4 of the piece of the divided data #4, as a download resume position, in the download start position management table illustrated in FIG. 15B so that the piece of the divided data #4 can be re-downloaded later. If the download complete position Pf is half or more than half of the piece of the divided data #4, the update control unit 13 (the acquisition unit 133) continues the download of the piece of the divided data #4 and interrupts the download after the download of the piece of the divided data #4 is completed. In this case, the update control unit 13 (the acquisition unit 133) stores, as a next start position (resume position), a head position P5 of a next piece of divided data #5 in the download start position management table. The update control unit 13 (the acquisition unit 133) resumes the download from the start position written in the download start position management table upon receiving a download start request.

Furthermore, as a method to interrupt the pre-download, there is a known method in which the update control unit 13 (the acquisition unit 133) immediately interrupts the pre-download to eliminate the influence on the network bandwidth due to the download. In this case, the download is immediately interrupted regardless of whether the download complete position Pf in FIG. 15A is less than half, half, or more than half of the piece of the divided data #4. Therefore, the update control unit 13 stores the head position P4 of the piece of the divided data #4 in the download start position management table. While the example has been described in which it is determined whether or not more than half of a piece of divided data is downloaded, it may be possible to determine whether or not more than half of entire pre-download data is downloaded. Furthermore, it may be possible to determine whether or not a downloaded portion of a piece of data or the entire pre-download data exceeds a predetermined value (ratio), instead of determining whether or not more than half of each data is downloaded.

Figure 16:
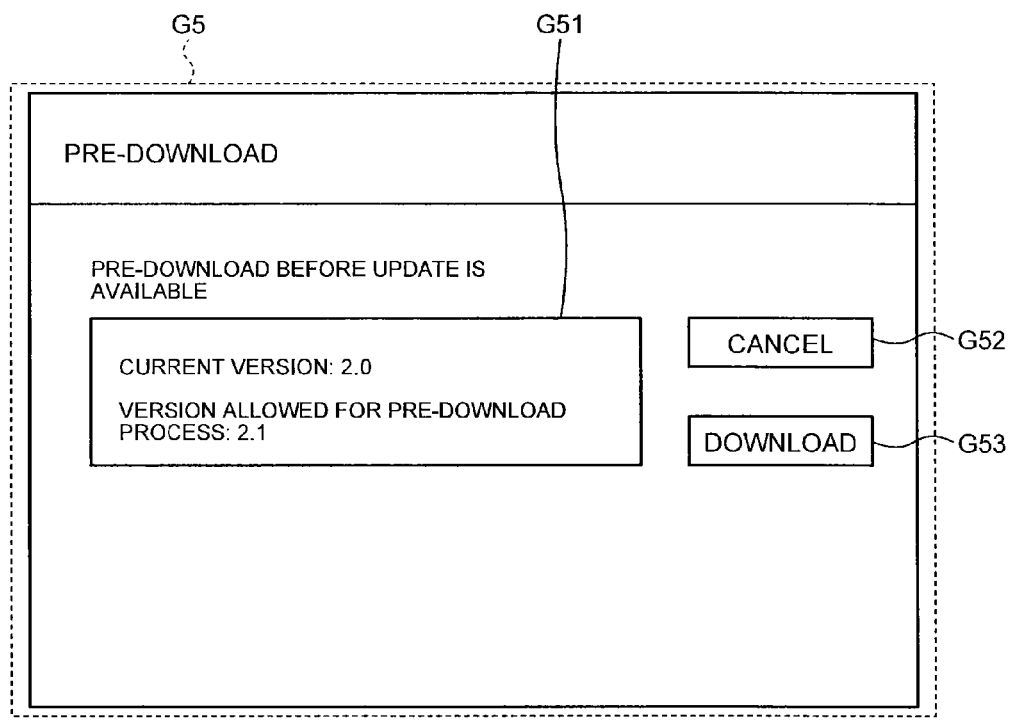
FIG. 16 is a view illustrating an example of a pre-download confirmation screen of the third embodiment.
Figure 17:
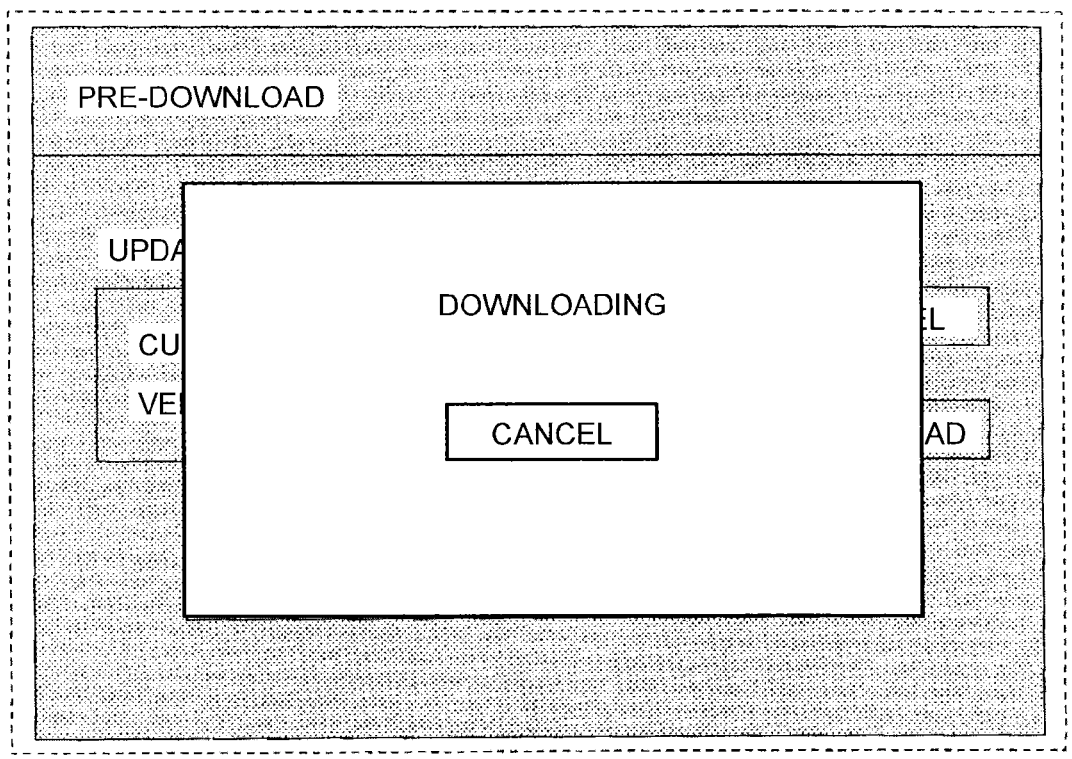
FIG. 17 is a view illustrating an example of a pre-downloading screen of the third embodiment.

In the example of the process as described above, it is described that the terminal 10 automatically performs the pre-download when a predetermined condition is satisfied. However, it may be possible to perform the pre-download when a user selects a pre-download execution button. In this case, the pre-download is performed when a download button G53 is selected in a pre-download confirmation screen G5, which displays version information G51, as illustrated in FIG. 16. In this case, the user is able to wait for completion of the download or cancel the pre-download being executed by a cancel button G52 as illustrated in FIG. 17. If the pre-download is to be performed by the user via manual operation, it becomes possible to prevent a reduction in the quality of the teleconference by preventing the teleconference from being started until completion of the download.

According to the terminal system 100 of the third embodiment, it is possible to prevent execution of an unnecessary pre-download process of the terminal.

Supplemental Explanation of Embodiments

In the embodiments as described above, a teleconference system has been explained as an example of the terminal system 100 illustrated in FIG. 1. However, the terminal system 100 may be a telephone system for an Internet protocol (IP) phone, an Internet phone, or the like.

Furthermore, the terminal system 100 may be a communication system of a mobile phone (smartphone or the like). In this case, the terminal 10 corresponds to a mobile phone terminal. If the terminal 10 is a mobile phone terminal, it includes a main body of the mobile phone terminal, a display button provided on the main body, a display unit (touch panel) provided on the main body, a microphone provided on the main body, a speaker provided on the main body, and the like. In this case, for example, the terminal 10 is connected to the Internet via a mobile phone line (including radio communication that covers a relatively wide range mainly in outdoor areas, due to the transmitter power output from a base station).

Figure 18:
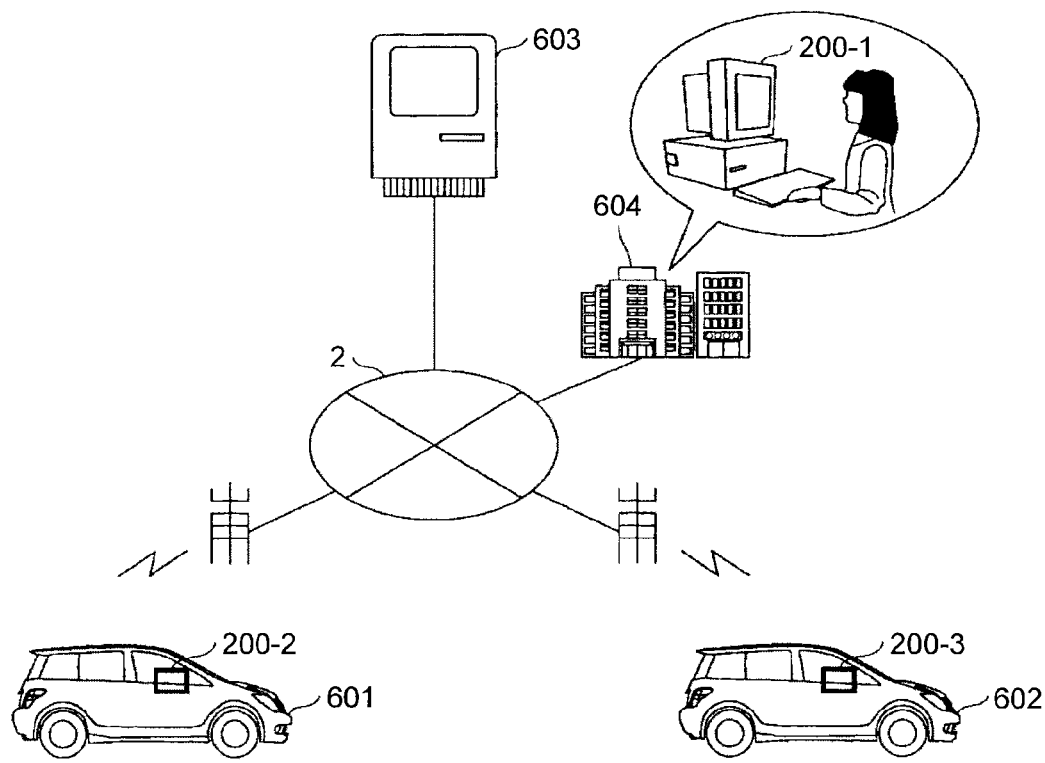
FIG. 18 is a view illustrating an example of a system configuration when the terminals are applied automotive navigation devices.

Moreover, the terminal system 100 may be a system including an automotive navigation device installed in a mobile object. FIG. 18 is a view illustrating an example of a system configuration when the terminals 10 are applied to automotive navigation devices. In this case, one of the terminals 10 corresponds to an automotive navigation device 200-2 installed in an automobile 601. The other terminals 10 correspond to a management device 200-1 used by a communicator in a management center 604, a management server 603 that manages the automotive navigation devices, and an automotive navigation device 200-3 installed in an automobile 602. The management device 200-1, the automotive navigation device 200-2, the automotive navigation device 200-3, and the management server 603 are connected to one another via a network 2.

Figure 19:
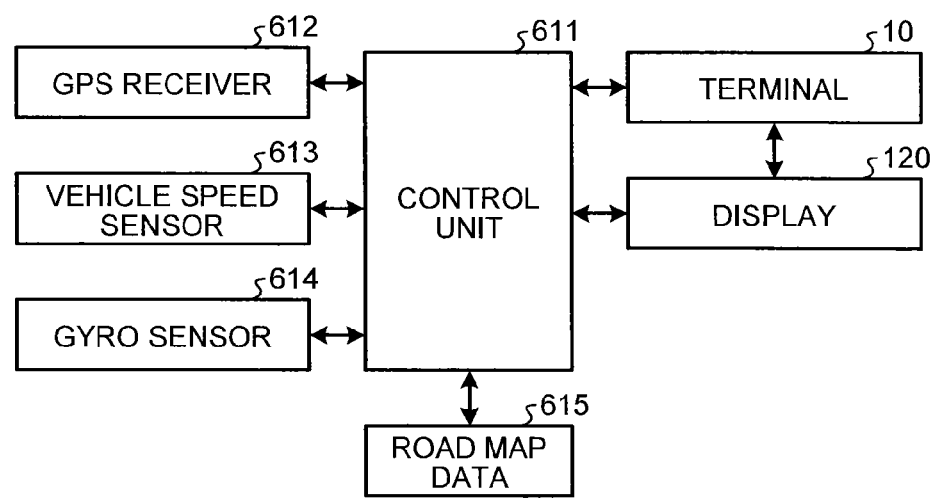
FIG. 19 is a view illustrating an example of a configuration of the automotive navigation device.

FIG. 19 is a view illustrating an example of a configuration of the automotive navigation device. The automotive navigation device includes a control unit 611 that controls the entire device, a global positioning system (GPS) receiver 612, a vehicle speed sensor 613, a gyro sensor 614, road map data 615, and the display 120, and the control unit 611 is connected to the terminal 10 that is able to communicate with the other terminals 10 connected to the network 2. The control unit 611 is an information processing apparatus, such as a microcomputer, and executes a program to implement a function as the automotive navigation device. The GPS receiver 612 outputs the coordinate of a current position by supplementing GPS satellites. The vehicle speed sensor 613 is a sensor that detects the speed of an automobile (rotational speed of wheels). The gyro sensor 614 is a sensor that detects angular velocities, and is able to detect a running direction of a vehicle by integrating the angular velocities.

The road map data 615 is data representing a road by a combination of nodes and links, and may be downloaded from external apparatuses or may be stored in a vehicle in advance. The road map is displayed on the display 120.

Incidentally, the automotive navigation device may include an audio function to output music or television (TV) broadcast, a function to interact with an in-vehicle camera, such as a rear-view camera, a browser function to display web sites, and the like in addition to the configuration illustrated in FIG. 19.

The control unit 611 applies dead reckoning, in which running distances detected by the vehicle speed sensor 613 in the running direction detected by the gyro sensor 614 are accumulated with respect to the location information detected by the GPS receiver 612, to thereby estimate the position of the subject automobile. The position of the subject automobile is displayed on the road map by a mark indicating the subject automobile.

The automotive navigation device is connected to the network 2 via a mobile phone line (including radio communication that covers a relatively wide range mainly in outdoor areas, due to the transmitter power output from a based station) by using the functions of the terminal 10 or the functions of the mobile phone terminal.

The terminal 10 (automotive navigation device) displays, on the display 120, a list of destination terminals including the other terminals 10 connected to the network 2. If one of the destination terminals is selected from the list of the destination terminals displayed on the display 120 and a session with the destination terminal is established, the terminal 10 (the automotive navigation device) is able to transmit and receive image data, audio data, and the like to and from the selected destination terminal. Furthermore, an information processing apparatus (the control unit 611) is able to load display data, such as a road map or TV pictures, by operation of the terminal 10 (automotive navigation device). The terminal 10 (automotive navigation device) is able to transmit the display data to the other terminals 10 (the automotive navigation devices) connected to the network 2.

As described above, the terminal 10 (the automotive navigation device) installed in a mobile object transmits and receives image data, audio data, display data, and the like, similarly to the terminal 10 of the teleconference system. Therefore, the terminal system 100 of the first to the third embodiments may be a system including the terminal 10 (automotive navigation device) installed in a mobile object.

Finally, the description of the program 104 adapted to control the operation of the terminal 10 of the first to the third embodiments will be supplemented.

The program 104 adapted to control the operation of the terminal 10 of the first and the second embodiments may be recorded in a computer readable recording medium such as a CD-ROM, a memory card, a CD-R, and a DVD (Digital Versatile Disk) with a file in an installable form or an executable form and provided as a computer program product.

Further, the program 104 adapted to control the operation of the terminal 10 of the first to the third embodiments may be provided by storing it in a computer connected to a network such as the Internet and causing it to be downloaded via the network. Further, the program 104 adapted to control the operation of the terminal 10 of the first to the third embodiments may be provided or delivered via a network such as the Internet.

Further, the program 104 adapted to control the operation of the terminal 10 of the first to the third embodiments may be embedded in advance in the ROM 102 and the like and then provided.

The program 104 adapted to control the operation of the terminal 10 of the first to the third embodiments is configured in a module including the above-described respective functional blocks of FIG. 1 (the communication unit 11, the user interface unit 12 (the operation accepting unit 121, the execution confirmation unit 122, and the notification unit 123), and the update control unit 13 (the update confirmation unit 131, the determination request unit 132, the acquisition unit 133, the updating unit 134, the power supply determination unit 135, and the communication state determination unit 136)). In the actual hardware, each of these functional blocks is loaded on the RAM 103 by that the CPU 101 reads out the program 104 from the storage unit 105 and executes it. That is, each of the above-described functional blocks is generated on the RAM 103.

It is noted that a part of or all of the above-described respective functional blocks of FIG. 1 may be implemented by the hardware such as an IC (Integrated Circuit) rather than implemented by the software.

The terminal systems 100 of the first to the third embodiments allow for the prevention of the execution of unnecessary update process of the terminal.

According to the present embodiments, it is possible to prevent the execution of the unnecessary update process of the terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal, comprising:
   a transmitter configured to transmit a request to a terminal management device to determine whether or not the terminal is allowed to execute an update of a program;
   circuitry configured to, in response to receiving, from the terminal management device, information indicating that the terminal is allowed to execute the update of the program,
      determine, using a table associating each of a plurality of terminal types with a respective power supply confirmation necessity indication, whether or not it is necessary to confirm that the terminal is connected to a power supply, and
      when it is determined that it is not necessary to confirm that the terminal is connected to the power supply, acquire an update program from an update management device, the update management device being different than the terminal management device, and execute the update program received from the update management device.

2. The terminal according to claim 1, wherein
   the circuitry is further configured to confirm with the update management device as to whether or not there is the update of the program of the terminal;
   the terminal further comprises a computer interface configured to, when there is the update of the program, confirm with a user of the terminal as to whether or not to execute the update of the program, and
   when it has been determined by the circuitry that there is the update and the user of the terminal has selected to update the program, the transmitter requests the terminal management device for the determination.

3. The terminal according to claim 1, wherein the circuitry is further configured to determine whether or not the terminal is connected to a power supply, and
   when the terminal is not connected to the power supply, the circuitry does not execute the update program.

4. The terminal according to claim 3, wherein when information indicating that it is necessary to determine whether or not the terminal is connected to the power supply is included in information indicating that the terminal is able to execute an update of a program, the circuitry determines whether or not the terminal is connected to the power supply.

5. The terminal according to claim 1, further comprising:
   a battery configured to charge electric power,
   wherein the circuitry is further configured to determine whether or not the terminal is performing wired communication,
   wherein the circuitry further determines a residual power amount of the battery, and
   wherein, when the terminal is performing wired communication and the residual power amount of the battery is greater than or equal to a threshold, the circuitry executes the update program even when the terminal is not connected to the power supply.

6. The terminal according to claim 1, further comprising a computer interface configured to, when the circuitry is unable to execute the update program, notify a user of the terminal of information indicating that the update program is unable to be executed.

7. The terminal according to claim 1, wherein
   the circuitry requests the terminal management device to determine whether or not a pre-download to download the update program in advance is allowed to be executed on the terminal, and
   the circuitry acquires, when the circuitry receives information indicating that the terminal is allowed to execute the pre-download, the update program from the update management device.

8. The terminal according to claim 7, wherein when it is determined that it is necessary to confirm that the terminal is connected to the power supply, the circuitry is configured to determine whether or not the terminal is connected to the power supply, wherein
   when the terminal is not connected to the power supply, the circuitry does not acquire the update program.

9. The terminal according to claim 8, wherein the circuitry is configured to determine whether or not it is necessary to confirm that the terminal is connected to the power supply by referring to information included in the information indicating that the terminal is allowed to execute the pre-download.

10. The terminal according to claim 7, further comprising:
    a battery configured to charge electric power, wherein
    the circuitry is further configured to determine whether or not the terminal is performing wired communication,
    wherein the circuitry further determines a residual power amount of the battery, and
    wherein, when the terminal is performing wired communication and the residual power amount of the battery is equal to or greater than a threshold, the circuitry acquires the update program even when the terminal is not connected to the power supply.

11. The terminal according to claim 7, wherein
    the terminal is used in a conference system, and
    when the terminal has started a conference, the circuitry does not acquire the update program.

12. The terminal of claim 1, wherein the circuitry is configured to request the terminal management device to determine whether or not the update of the program is allowed to be executed on the terminal, after a user of the terminal has selected to execute the update of the program.

13. A terminal system, comprising:
    a terminal;
    a terminal management device configured to manage information of the terminal; and an update management device configured to manage an update of a program of the terminal, the update management device being different than the terminal management device, wherein the terminal includes:
- a transmitter configured to transmit a request to the terminal management device to determine whether or not the terminal is allowed to execute the update of the program;
- circuitry configured to, in response to receiving, from the terminal a management device, information indicating that the terminal is allowed to execute the update of the program, determine, using a table associating each of a plurality of terminal types with a respective power supply confirmation necessity indication, whether or not it is necessary to confirm that the terminal is connected to a power supply, and when it is determined that it is not necessary to confirm that the terminal is connected to the power supply, acquire an update program from the update management device and execute the update program received from the update management device.

14. A non-transitory computer-readable medium comprising computer readable program codes, performed by a terminal connected to a terminal management device and an update management device, the program codes when executed causing the terminal to execute:
- requesting the terminal management device to determine whether or not the terminal is allowed to execute an update of a program;
- in response to receiving, from the terminal management device, information indicating that the terminal is allowed to execute the update of the program, determine, using a table associating each of a plurality of terminal types with a respective power supply confirmation necessity indication, whether or not it is necessary to confirm that the terminal is connected to a power supply, and when it is determined that it is not necessary to confirm that the terminal is connected to the power supply, acquiring an update program from the update management device; and
- executing the update program received from the update management device.

* * * * *